(12) United States Patent
Schlecht (10) Patent No.: US 6,731,520 B2
(45) Date of Patent: May 4, 2004

(54) HIGH EFFICIENCY POWER CONVERTER (75) Inventor: Martin F. Schlecht, Lexington, MA (US)

(73) Assignee: SynQor, Inc., Boxborough, MA (US)

( * ) Notice: Subject to any disclaimer, the term of this patent is extended or adjusted under 35 U.S.C. 154(b) by 0 days.

(21) Appl. No.: 10/359,457

(22) Filed: Feb. 5, 2003

(65) Prior Publication Data
US 2003/0112645 A1 Jun. 19, 2003

Related U.S. Application Data (60) Continuation of application No. 09/821,655, filed on Mar. 29, 2001, now Pat. No. 6,594,159, which is a division of application No. 09/417,867, filed on Oct. 13, 1999, now Pat. No. 6,222,742, which is a division of application No. 09/012,475, filed on Jan. 23, 1998, now Pat. No. 5,999,417
(60) Provisional application No. 60/036,245, filed on Jan. 24, 1997.

(51) Int. Cl.⁷ .............................................. H02M 3/335
(52) U.S. Cl. ........................................................ 363/16
(58) Field of Search .......................... 363/15–17, 21.06, 363/21.14, 56.01, 56.02, 95, 97, 131, 132

(56) References Cited

U.S. PATENT DOCUMENTS

| | | | |
|---|---|---|---|
| 3,663,941 A | 5/1972 | Pasciutti | 321/2 |
| 4,788,450 A | 11/1988 | Wagner | |
| 4,788,634 A | 11/1988 | Schlecht et al. | 363/21 |
| 4,812,672 A | 3/1989 | Cowan et al. | |
| 5,019,954 A | 5/1991 | Bourgeault et al. | 363/21 |
| 5,179,512 A | 1/1993 | Fisher et al. | 363/127 |
| 5,274,543 A | 12/1993 | Loftus, Jr. | 363/127 |
| 5,303,138 A | 4/1994 | Rozman | 363/21 |
| 5,343,383 A | 8/1994 | Shinada et al. | |
| 5,396,412 A | 3/1995 | Barlage | |
| 5,528,482 A | 6/1996 | Rozman | 363/21 |
| 5,621,621 A | 4/1997 | Lilliestrale | |
| 5,625,541 A | 4/1997 | Rozman | 363/21 |
| 5,726,869 A | 3/1998 | Yamashita et al. | 363/21 |
| 5,774,350 A | 6/1998 | Notaro et al. | 363/89 |
| 5,789,871 A * | 8/1998 | Shen et al. | 315/291 |
| 5,870,299 A | 2/1999 | Rozman | 363/127 |
| 5,872,705 A | 2/1999 | Loftus, Jr., et al. | 363/21 |
| 5,880,949 A | 3/1999 | Melhem et al. | |
| 6,016,258 A | 1/2000 | Jain et al. | |
| 6,046,920 A | 4/2000 | Cazabat et al. | |
| 6,066,943 A | 5/2000 | Hastings et al. | |
| 6,088,329 A | 7/2000 | Lindberg et al. | 370/217 |
| 6,563,720 B2 * | 5/2003 | Kitano | 363/21.15 |

FOREIGN PATENT DOCUMENTS

| | | |
|---|---|---|
| EP | 0 549 920 | 7/1993 |
| JP | 06315263 | 11/1994 |
| WO | WO88/09084 | 11/1988 |

OTHER PUBLICATIONS

Casey, Leo Francis, "Circuit Design For 1–10 MHZ DC–DC Conversion," MIT Doctoral Thesis, Jan. 1989, pp 1–216.
Ferencz, Andrew, "A 250 W High Density Point–of–Load Converter," MIT Master of Science Thesis, Sep. 1989, pp. 1–117.

(List continued on next page.)

Primary Examiner—Matthew V. Nguyen
(74) Attorney, Agent, or Firm—Hamilton, Brook, Smith & Reynolds, P.C.

(57) ABSTRACT

A power converter nearly losslessly delivers energy and recovers energy from capacitors associated with controlled rectifiers in a secondary winding circuit, each controlled rectifier having a parallel uncontrolled rectifier. First and second primary switches in series with first and second primary windings, respectively, are turned on for a fixed duty cycle, each for approximately one half of the switching cycle. Switched transition times are short relative to the on-state and off-state times of the controlled rectifiers. The control inputs to the controlled rectifiers are cross-coupled from opposite secondary transformer windings.

26 Claims, 7 Drawing Sheets

OTHER PUBLICATIONS

Mohandes, Bijan, MOSFET Synchronous Rectifiers Achieve 90% Efficiency—Part I and Part II, PCIM, Jun. 1991, pp. 10–13 & 55–61.

Cobos, J.A., et al., "Resonant Reset Forward Topologies for Low Output Voltage on Board Converters," IEEE, 1994, pp 703–708.

Tabisz, W.A., et al., "A MOSFET Resonant Synchronous Rectifier for High–Frequency DC/DC Converters," Proceedings of the Power Electronics Specialists Conference, San Antonio, TX, Jun. 10–15, 1990, pp 769–779.

Wiegman, H.L.N., et al., "A Dual Active Bridge SMPS Using Synchronous Rectifiers," HFPC May 1990 Proceedings, pp 336–346.

Shoyama, Masahito, et al., "Zero–Voltage–Switching Realized by Magnetizing Current of Transformer in Push–Pull Current–Fed DC–DC Converter," IEEE, 1993, pp 178–184.

Shoyama, Masahito, et al., "Zero–Voltage–Switched Push–Pull DC–DC Converter," IEEE, 1991, pp 223–229.

Xiao, Li, et al, "Soft Switched PWM DC/DC Converter With Synchronous Rectifiers," IEEE 1996, pp 476–484.

Blanchard, Richard, et al., "The Design of a High Efficiency, Low Voltage Power Supply Using MOSFET Synchronous Rectification and Current Mode Control," IEEE, 1985, pp 355–361.

Jitaru, Ionel Dan, et al, "High Efficiency DC–DC Converter," IEEE, 1994, pp. 638–644.

Harper, D.J., et al., "Controlled Synchronous Rectifier," HFPC May 1988 Proceedings, pp 165–172.

Acker, Brian, et al., "Current–Controlled Synchronous Rectification," IEEE 1994, pp 185–191.

Murakami, Naoki, et al., "A High–Efficiency 30–W Board Mounted Power Supply Module," IEEE 1991, pp 122–127.

Casey, Leo F., et al., "A High Frequency, Low Volume, Point–of–Load Power Supply for Distributed Power Systems," IEEE 1987, pp 439–450.

Schlecht, Martin F., "Research Results from the Study of A High Efficiency, Highly Manufacturable DC–DC Converter," unpublished, pp 1–32.

Gachora, John Mburu, "Design of a Four–Phase Switchmode High Efficiency Power Supply," MIT Master of Engineering Thesis, 1994, pp 1–66.

Blanchard R., et al., "MOSFETs Move In On Low Voltage Rectification," Official Proceedings of the Ninth International PCI '84 Conference, Oct. 29–31, 1984, pp 213–222.

Garcia, O. et al., "Zero Voltage Switching In The PWM Half Bridge Topology With Complementary Control And Synchronous Rectification," Record of the Annual Power Electronics Specialist Conference, Pesc, Atlanta, Jun. 12–15, 1995, vol. 1, No. CONF. 26, Jun. 12, 1995, IEEE, pp 286–291.

* cited by examiner

HIGH EFFICIENCY POWER CONVERTER

RELATED APPLICATIONS

This application is a continuation of application Ser. No. 09/821,655, filed Mar. 29, 2001, now U.S. Pat. No. 6,594,159, which is a divisional of application Ser. No. 09/417,867, filed Oct. 13, 1999, now U.S. Pat. No. 6,222,742, which is a divisional of Ser. No. 09/012,475, filed Jan. 23, 1998, now U.S. Pat. No. 5,999,417, which claims the benefit of U.S. Provisional Application No. 60/036,245 filed Jan. 24, 1997.

The entire teachings of the above applications are incorporated herein by reference.

BACKGROUND OF THE INVENTION

This invention pertains to switching power converters. A specific example of a power converter is a DC-DC power supply that draws 100 watts of power from a 48 volt DC source and converts it to a 5 volt DC output to drive logic circuitry. The nominal values and ranges of the input and output voltages, as well as the maximum power handling capability of the converter, depend on the application.

It is common today for switching power supplies to have a switching frequency of 100 kHz or higher. Such a high switching frequency permits the capacitors, inductors, and transformers in the converter to be physically small. The reduction in the overall volume of the converter that results is desirable to the users of such supplies.

Another important attribute of a power supply is its efficiency. The higher the efficiency, the less heat that is dissipated within the supply, and the less design effort, volume, weight, and cost that must be devoted to remove this heat. A higher efficiency is therefore also desirable to the users of these supplies.

A significant fraction of the energy dissipated in a power supply is due to the on-state (or conduction) loss of the diodes used, particularly if the load and/or source voltages are low (e.g. 3.3, 5, or 12 volts). In order to reduce this conduction loss, the diodes are sometimes replaced with transistors whose on-state voltages are much smaller. These transistors, called synchronous rectifiers, are typically power MOSFETs for converters switching in the 100 kHz and higher range.

The use of transistors as synchronous rectifiers in high switching frequency converters presents several technical challenges. One is the need to provide properly timed drives to the control terminals of these transistors. This task is made more complicated when the converter provides electrical isolation between its input and output because the synchronous rectifier drives are then isolated from the drives of the main, primary side transistors. Another challenge is the need to minimize losses during the switch transitions of the synchronous rectifiers. An important portion of these switching losses is due to the need to charge and discharge the parasitic capacitances of the transistors, the parasitic inductances of interconnections, and the leakage inductance of transformer windings.

SUMMARY OF THE INVENTION

Various approaches to addressing these technical challenges have been presented in the prior art, but further improvements are needed. In response to this need, a new power circuit topology designed to work with synchronous rectifiers in a manner that better addresses the challenges is presented here.

In preferred embodiments of the invention, a power converter comprises a power source and a primary transformer winding circuit having at least one primary winding connected to the source. A secondary transformer winding circuit has at least one secondary winding coupled to the at least one primary winding. Plural controlled rectifiers, such as voltage controlled field effect transistors, each having a parallel uncontrolled rectifier, are connected to a secondary winding. Each controlled rectifier is turned on and off in synchronization with the voltage waveform across a primary winding to provide an output. Each primary winding has a voltage waveform with a fixed duty cycle and transition times which are short relative to the on-state and off-state times of the controlled rectifiers. A regulator regulates the output while the fixed duty cycle is maintained.

In the preferred embodiments, first and second primary transformer windings are connected to the source and first and second primary switches are connected in series with the first and second primary windings, respectively. First and second secondary transformer windings are coupled to the first and second primary windings, respectively. First and second controlled rectifiers, each having a parallel uncontrolled rectifier, are in series with the first and second secondary windings, respectively. A controller turns on the first and second primary switches in opposition, each for approximately one half of the switching cycle with transition times which are short relative to the on-state and off-state times of the first and second controlled rectifiers. The first and second controlled rectifiers are controlled to be on at substantially the same times that the first and second primary switches, respectively, are on.

In a system embodying the invention, energy may be nearly losslessly delivered to and recovered from capacitors associated with the controlled rectifiers during their transition times.

In the preferred embodiments, the first primary and secondary transformer windings and the second primary and secondary transformer windings are on separate uncoupled transformers, but the two primary windings and two secondary windings may be coupled on a single transformer.

Preferably, each controlled rectifier is turned on and off by a signal applied to a control terminal relative to a reference terminal of the controlled rectifier, and the reference terminals of the controlled rectifiers are connected to a common node. Further, the signal that controls each controlled rectifier is derived from the voltage at the connection between the other controlled rectifier and its associated secondary winding.

Regulation may be through a separate regulation stage which in one form is on the primary side of the converter as part of the power source. Power conversion may then be regulated in response to a variable sensed on the primary side of the converter. Alternatively, the regulator may be a regulation stage on the secondary side of the converter, and power conversion may be regulated by control of the controlled rectifiers. Specifically, the on-state voltage of a controlled rectifier may be made larger than its minimum value to provide regulation, or the on-state duration of a controlled rectifier may be shorter than its maximum value to provide regulation.

The preferred systems include reset circuits associated with transformers for flow of magnetizing current. The energy stored in the magnetizing inductance may be recovered. In one form, the reset circuit comprises a tertiary transformer winding, and in another form it comprises a clamp.

In preferred embodiments, the power source has a current fed output, the current fed output characteristic of the power source being provided by an inductor. Alternatively, the power source may have a voltage-fed output where the voltage-fed output characteristic of the power source is provided by a capacitor. In either case, the characteristics may alternatively be provided by active circuitry.

With the preferred current-fed output, the primary switches are both turned on during overlapping periods, and the overlapping periods may be selected to achieve maximum efficiency. With the voltage-fed output, the primary switches are both turned off during overlapping periods. Additional leakage or parasitic inductance may be added to the circuit to accommodate an overlap period.

In one embodiment, a signal controlling a controlled rectifier is derived with a capacitive divider circuit. A circuit may determine the DC component of the signal controlling the controlled rectifier, and the DC component of the signal may be adjusted to provide regulation.

In accordance with another aspect of the invention, an ORing controlled rectifier connects the converter's output to an output bus to which multiple converter outputs are coupled, and the ORing controlled rectifier is turned off if the power converter fails. Preferably, the signal controlling the ORing controlled rectifier is derived from one or more secondary windings. The ORing controlled rectifier is turned on when the converter's output voltage approximately matches the bus voltage.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

One embodiment of the invention described herein pertains to an electrically isolated DC-DC converter that might be used to deliver power at a low DC voltage (e.g. 5 volts) from a DC source such as a battery or a rectified utility. In such a converter a transformer is used to provide the electrical isolation and to provide a step-down (or step-up) in voltage level according to its turns-ratio. Switches in the form of power semiconductor transistors and diodes are used in conjunction with capacitors and inductors to create the conversion. A control circuit is typically included to provide the drive signals to the transistors' control terminals.

When the switching frequency is high (e.g. 100 kHz and above) it is typical today to use power MOSFETs and Schottky diodes for the converter's switches since these majority carrier devices can undergo faster switch transitions than minority carrier devices such as power bipolar transistors and bipolar diodes.

Most DC-DC converters are designed to provide regulation of their output voltage in the face of input voltage and output current variations. For example, a converter might need to maintain a 5 volt output (plus or minus a few percent) as its input varies over the range of 36 to 75 volts and its output current ranges from 1 to 25 amps. This ability to provide regulation is usually the result of the power circuit's topology and the manner in which its switching devices are controlled. Sometimes the regulation function is supplied by (or augmented with) a linear regulator.

Figure 1:
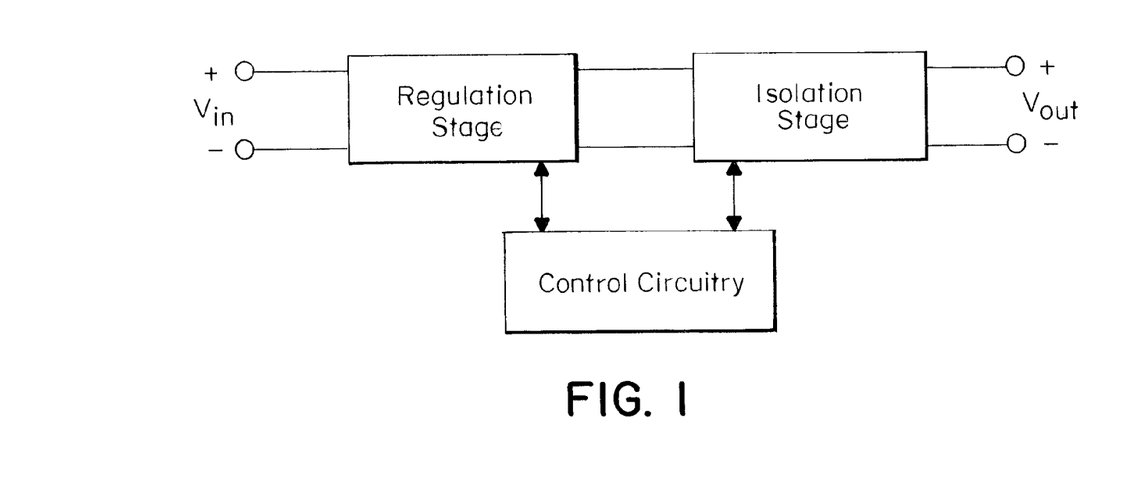
FIG. 1 is a block diagram illustrating a preferred embodiment of the invention.

FIG. 1 shows a block diagram of a DC-DC converter that represents one embodiment of the invention. It shows a two stage converter structure where the power first flows through one stage and then through the next. One stage provides the regulation function and the other provides the electrical isolation and/or step-down (or step-up) function. In this embodiment the regulation stage is situated before the isolation stage, but this ordering is not necessary for the invention. Notice also that the block diagram shows a control function. As mentioned, the purpose of this control function is to determine when the transistors in the power circuit will be turned on and off (or to determine the drive of a linear regulator). To aid in this function the control circuit typically senses voltages and currents at the input, at the output, and/or within the power circuit.

Figure 2:
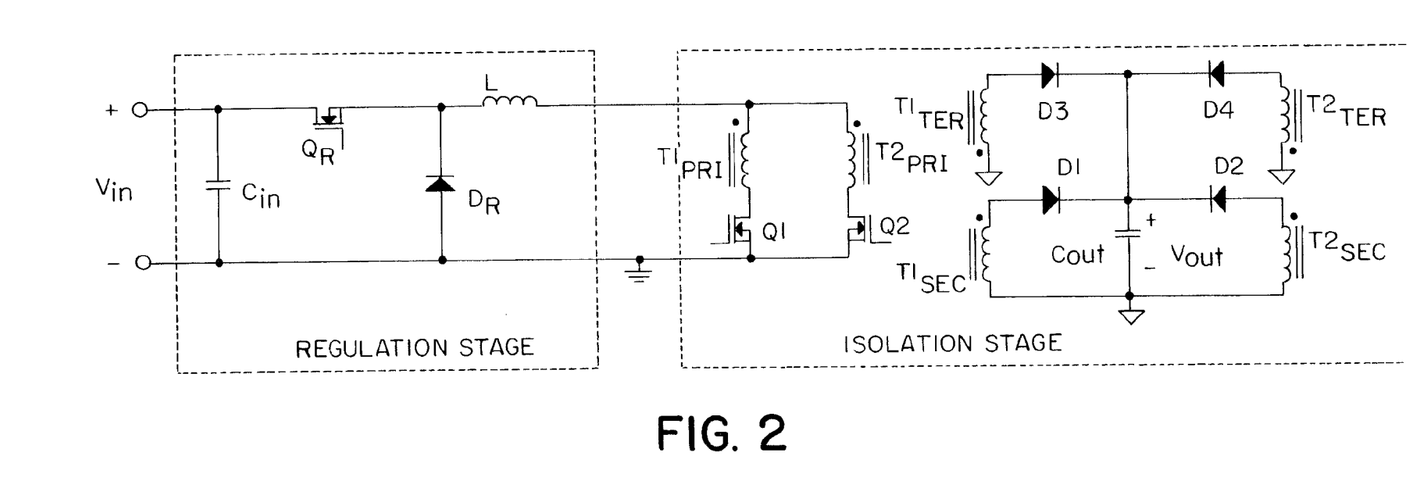
FIG. 2 is a schematic of an embodiment of the invention with synchronous rectifiers replaced by diodes.

FIG. 2 shows one way to implement the two power stages represented in the block diagram of FIG. 1. In this figure diodes, rather than synchronous rectifiers, are used to simplify the initial description of the circuit's operation. The topology of the regulation stage is that of a "down converter". This canonical switching cell has a capacitor, $C_{IN}$, a transistor, $Q_R$, a diode, $D_R$, and an inductor, L. Regulation is by control of the duty cycle of the transistor $Q_R$ in response to one or more parameters sensed in the circuit. In a well known manner the regulation stage can be modified by providing higher order filters at its input and output, by replacing the diode with a synchronous rectifier, by adding resonant elements to create a "multi-resonant" converter and the like.

The topology of the isolation stage shown in FIG. 2 has two transformers that are not, in this case, coupled. Each of these transformers T1 and T2 has three windings: a primary winding $T1_{PRI}$, $T2_{PRI}$; a secondary winding $T1_{SEC}$, $T2_{SEC}$; and a tertiary winding $T1_{TER}$, $T2_{TER}$. The transformer windings are connected through MOSFETs Q1 and Q2 on the primary windings and through diodes D1, D2, D3, and D4 on the secondary and tertiary windings. The stage is "current-fed", in this case by the inductor L from the output of the regulation stage. By this it is meant that the current flowing into the primary side of the isolation stage is held relatively constant over the time frame of the switching cycle. It also means that the voltage across the primary side of the isolation stage is free to have large, high frequency components. The output filter is simply a capacitor $C_{OUT}$ whose voltage is relatively constant over the time frame of the switching cycle. Additional filtering stages could be added to this output filter in a known manner.

The operation of the isolation stage proceeds in the following manner. First, for approximately one half of the switching cycle, transistor Q1 is on and Q2 is off. The current flowing through inductor L therefore flows through the primary winding of transformer T1, and a corresponding current (transformed by the turns ratio) flows through the secondary winding of T1 and through diode D1 to the output filter capacitor $C_{OUT}$ and the load. During this time the magnetizing current in T1 is increasing due to the positive voltage placed across its windings. This positive voltage is determined by the output capacitor voltage, $V_{OUT}$, plus the forward voltage drop of D1.

During the second half of the switching cycle, transistor Q2 and diode D2 are on and Q1 and D1 are off. While the current of inductor L flows through transformer T2 in the same manner as described above for T1, the magnetizing current of transformer T1 flows through its tertiary winding and diode D3 to the output filter capacitor, $C_{OUT}$. This arrangement of the tertiary winding provides a means to reset the T1 transformer core with a negative voltage and to recover most of the magnetizing inductance energy. The tertiary winding may alternatively be connected to other suitable points in the power circuit, including those on the primary side of the transformer.

Other techniques for resetting the core and/or for recovering the magnetizing energy are known in the art and may be used here. In particular, the tertiary winding could be eliminated and replaced with a conventional clamp circuit attached to either the primary or secondary winding and designed to impose a negative voltage across the transformer during its operative half cycle. Techniques to recover the energy delivered to this clamp circuit, such as the one in which a transistor is placed in anti-parallel with a clamping diode so that energy can flow from the clamping circuitry back into the magnetizing inductance, could also be used.

Notice that because the isolation stage of FIG. 2 is fed by an inductor (L), it is important to make sure there is at least one path through which the current in this inductor can flow. At the transitions between each half cycle, it is therefore typical to turn on the new primary side transistor (say Q2) before turning off the old primary side transistor (say Q1). The time when both transistors are on will be referred to as an overlap interval.

In a conventional current-fed push-pull topology where all the transformer windings are coupled on a single core, turning on both primary-side transistors will cause the voltage across the transformer windings to drop to zero, the output diodes to turn off, and the power to stop flowing through the isolation stage.

Here, however, since two separate, uncoupled transformers are used, the voltage across the transformer windings does not have to collapse to zero when both Q1 and Q2 are on. Instead, both of the output diodes D1 and D2 turn on, both transformers have a voltage across them determined by the output voltage, and the current of inductor L splits (not necessarily equally) between the two halves of the isolation stage. The power flow through the isolation stage is therefore not interrupted (except to charge/discharge parasitic capacitances and inductances). This means the output filter ($C_{OUT}$) can be made much smaller and simpler than would otherwise be necessary. It also means that the isolation stage does not impose a large fundamental frequency voltage ripple across the inductor (L) which provides its current-fed input characteristic.

After an appropriate amount of overlap time has elapsed, the old primary side transistor (say Q1) is turned off. The voltage across this transistor rises as its parasitic capacitance is charged by the current that had been flowing through the channel. Once this voltage rises high enough to forward bias diode D3 connected to the tertiary winding, the transistor voltage becomes clamped, although an over-ring and/or a commutation interval will occur due to parasitic leakage inductance. Eventually, all of the current in inductor L will flow through switch Q2, switch Q1 will be off, and the magnetizing current of T1 will flow through diode D3.

Figure 3:
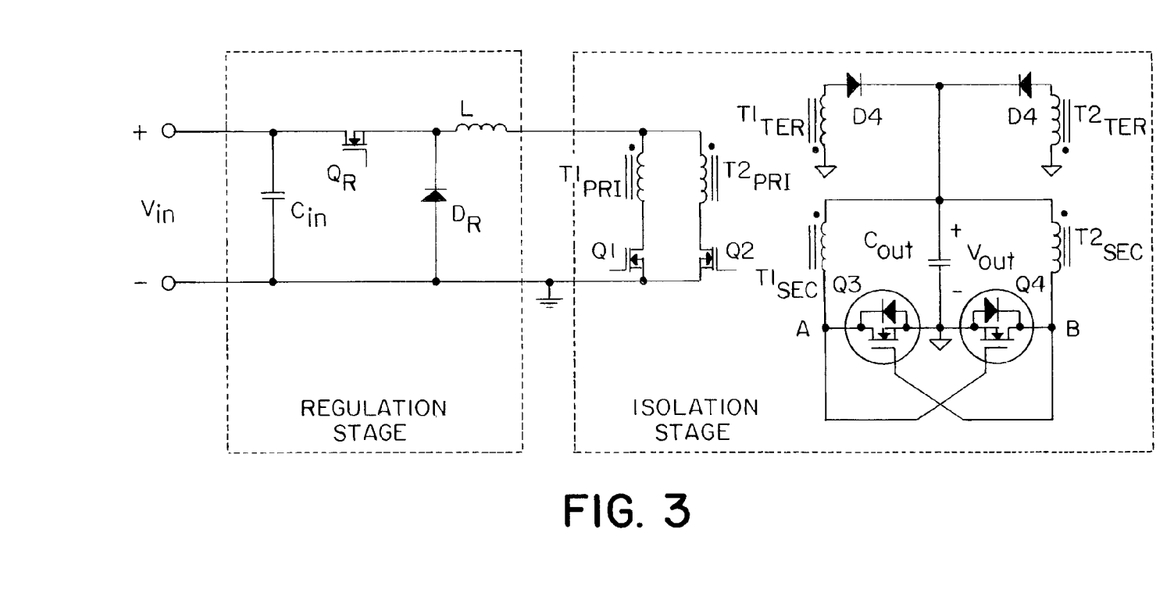
FIG. 3 is an illustration of a preferred embodiment of the invention with the controlled rectifiers and parallel uncontrolled rectifiers illustrated.
Figure 4:
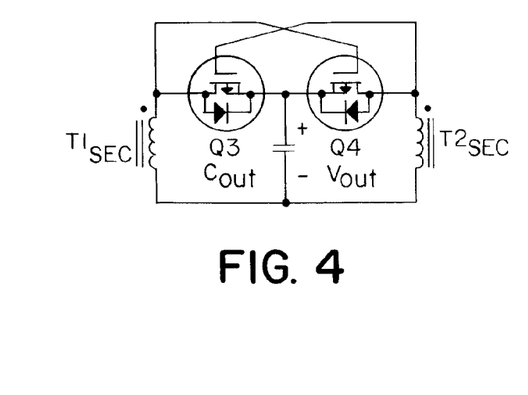
FIG. 4 illustrates an alternative location of the synchronous rectifiers in the circuit of FIG. 3.

Now replace output diodes D1 and D2 with MOSFET synchronous rectifiers Q3 and Q4, as shown in FIG. 3. Note that in this and later figures, the body diode of the MOSFET synchronous rectifier is explicitly shown since it plays a role in the circuit's operation. More generally, the schematical drawings of Q3 and Q4 depict the need for a controlled rectifier (e.g. a transistor) and an uncontrolled rectifier (e.g. a diode) connected in parallel. These two devices may be monolithically integrated, as they are for power MOSFETs, or they may be separate components. The positions of these synchronous rectifiers in the circuit are slightly different than the positions of the diodes in FIG. 2. They are still in series with their respective secondary windings, but are connected to the minus output terminal rather than the positive output terminal. This is done to have the sources of both N-channel MOSFETs connected to a single, DC node. If P-channel MOSFETs are to be used, their position in the circuit would be as shown in the partial schematic of FIG. 4. This position permits the P-channel devices to also have their sources connected to a single, DC node.

As shown in FIG. 3, the gates of the synchronous rectifier MOSFETs are cross-coupled to the opposite transformers. With this connection, the voltage across one transformer determines the gate voltage, and therefore the conduction state (on or off) of the MOSFET connected to the other transformer, and vice versa. These connections therefore provide properly timed drives to the gates of the MOSFETs without the need for special secondary side control circuitry.

For instance, during the half cycle in which transistor Q1 is turned on and transistor Q2 is off, the current of inductor L flows into the primary of T1 and out its secondary. This secondary side current will flow through transistor Q3 (note that even if Q3's channel is not turned on, the secondary side current will flow through the transistor's internal anti-parallel body diode). The voltage across transformer T1's secondary winding is therefore positive, and equal to the output voltage $V_{OUT}$ plus the voltage drop across Q3. The voltage across T2's secondary winding is negative during this time, with a magnitude approximately equal to the output voltage if the magnetizing inductance reset circuitry takes approximately the whole half cycle to finish its reset function. (The negative secondary winding voltage may be made greater than the positive voltage so that the core will finish its reset before the next half cycle begins. This could be accomplished, for example, by using less turns on the tertiary winding.)

Referring to FIG. 3, the voltage at node A during this state of operation is nearly zero with respect to the indicated secondary-side ground node (actually the voltage is slightly negative due to the drop across Q3). The voltage at node B, on the other hand, is, following our example, approximately twice the output voltage (say 10 volts for a 5 volt output). Given the way these nodes are connected to the synchronous rectifier transistors, Q3 is turned on and Q4 is turned off. These respective conduction states are consistent with transformer T1 delivering the power and transformer T2 being reset.

In the second half-cycle when Q2 is on and Q1 is off, the voltage at node B will be nearly zero (causing Q3 to be off) and the voltage at node A will be approximately twice the output voltage (causing Q4 to be on).

During the transition from one half-cycle to the next, the sequence of operation is as follows. Start with Q1 and Q3 on, Q2 and Q4 off. (The clamp circuit's diode D4 may still be on, or it may have stopped conducting at this point if the magnetizing inductance has finished resetting to zero.) First, Q2 is turned on. If we ignore the effects of parasitic capacitances and inductances, the voltage across T2 steps from a negative value to a positive value. The current flowing through inductor L splits between the two primary windings, causing current to flow out of both secondary windings. These secondary currents flow through Q3 and Q4. Since the voltages at both node A and node B are now nearly zero, Q3, which was on, will now be off, and Q4 will remain off (or more precisely, the channels of these two devices are off). The secondary side currents therefore flow through the body diodes of Q3 and Q4.

At the end of the overlap interval, Q1 is turned off. The current stops flowing through transformer T1, the body diode of Q3 turns off, and the voltage at node A rises from nearly zero to approximately twice the output voltage as T1 begins its reset half-cycle. With node A voltage high, the channel of transistor Q4 turns on, and the secondary side current of transformer T2 commutates from the body diode of Q4 to its channel.

Notice that during the overlap interval, the secondary side currents flow through the body diodes of transistors Q3 and Q4, not their channels. Since these diodes have a high on-state voltage (about 0.9V) compared to the on-state voltage of the channel when the gate-source voltage is high, a much higher power dissipation occurs during this interval. It is therefore desirable to keep the overlap interval short compared to the period of the cycle.

Notice also the benefit of using two, uncoupled transformers. The voltage across a first transformer can be changed, causing the channel of the MOSFET synchronous rectifier transistor connected to a second transformer to be turned off, before the voltage across the second transformer is made to change. This could not be done if both primary and both secondary windings were tightly coupled in the same transformer, since the voltages across all the windings would have to change together.

Figure 5:
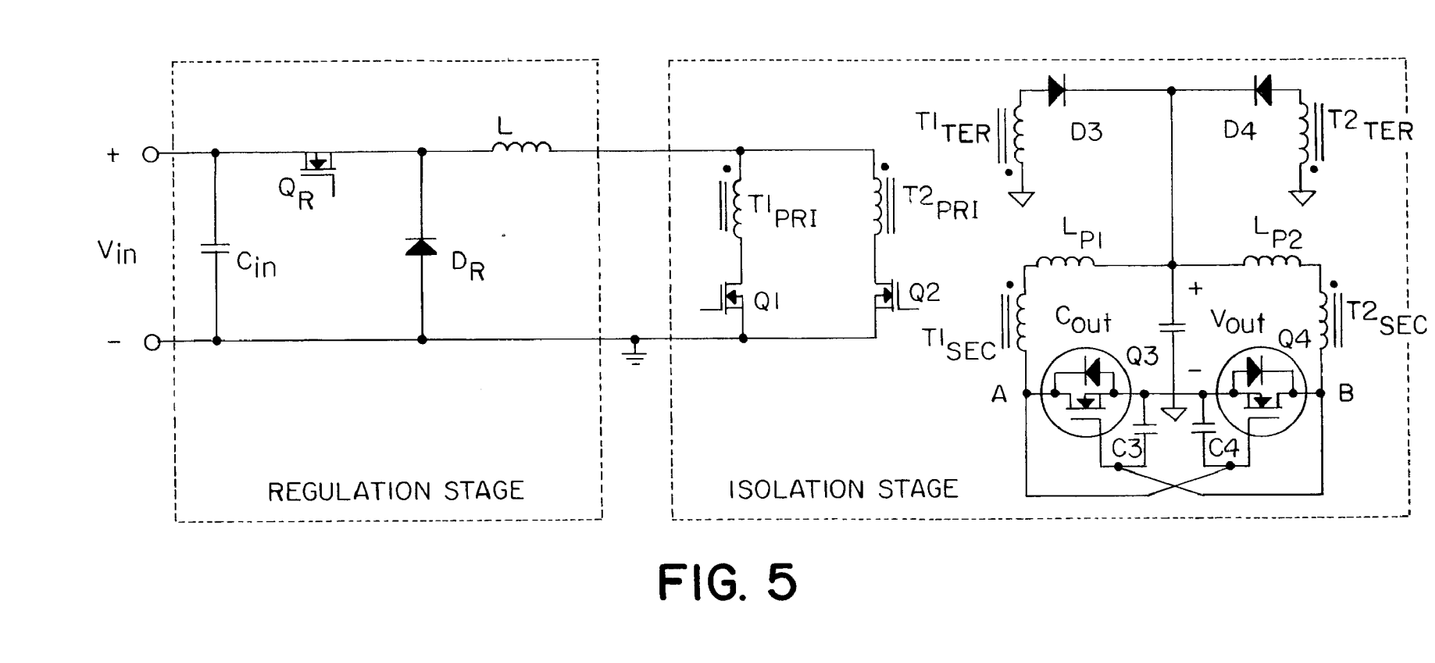
FIG. 5 illustrates the circuit of FIG. 3 with important parasitic capacitances and inductances illustrated.

FIG. 5 shows the same topology as FIG. 3, but with several important parasitic capacitances and inductances indicated schematically. Each indicated capacitor (C3 and C4) represents the combined effect of one synchronous rectifier's input capacitance and the other rectifier's output capacitance, as well as other parasitic capacitances. Each indicated inductor ($L_{P1}$ and $L_{P2}$) represents the combined effect of a transformer leakage inductance and the parasitic inductance associated with the loops formed by the primary side components and the secondary side components. These elements store significant energy that is dissipated each switching cycle in many prior art power circuits where diodes are replaced with synchronous rectifiers. Here, however, the energy stored in these parasitic components is nearly losslessly delivered to and recovered from them. By nearly lossless it is meant that no more than approximately 30% of the energy is dissipated. With one implementation of the present invention, less than 10% dissipation is obtained.

The nearly lossless delivery and recovery of energy is achieved because the circuit topology permits the synchronous rectifier switch transitions to proceed as oscillations between inductors and capacitors. These transitions are short compared to the overall on-state and off-state portions of the switching cycle (e.g. less than 20% of the time is taken up by the transition). This characteristic of nearly lossless and relatively short transitions, which we will call soft switching, is distinct from that used in full resonant, quasi-resonant, or multi-resonant converters where the oscillations last for a large portion, if not all, of the on-state and/or off-state time.

The way in which the soft-switching characteristic is achieved can be understood in the following manner. Start with transistors Q1 and Q3 on, Q2 and Q4 off. The voltage at node A, and therefore the voltage across C4, is nearly zero and the voltage at node B (and across C3) is approximately twice the output voltage. The current flowing through inductor L, $L_L$, is flowing into the primary winding of T1. The current flowing out of the secondary winding of T1 is $I_L$ minus the current flowing in T1's magnetizing inductance, $I_M$, both referenced to the secondary side. The magnetizing current is increasing towards its maximum value, $I_{MPK}$, which it reaches at the end of the half cycle.

When Q2 is turned on at the end of the half cycle, the voltage across both windings of both transformers steps to zero volts in the circuit model depicted in FIG. 5. An L-C oscillatory ring ensues between capacitor C3 and the series combination of the two parasitic inductances, $L_{P1}$ and $L_{P2}$. If we assume the parasitic capacitances and inductances are linear, the voltage across C3 decreases cosinusoidally toward zero while the current flowing out of the dotted end of T2's secondary winding, $I_{LP2}$, builds up sinusoidally toward a peak determined by the initial voltage across C3 divided by the characteristic impedance $$\sqrt{\frac{L_{P1} + L_{P2}}{C_3}}.$$

Note that the current flowing out of the dotted end of T1's secondary winding, $I_{LP1}$, decreases by the same amount that $I_{LP2}$ increases such that the sum of the two currents is $(I_L - I_{MPK})$, referenced to the secondary side. Also note that during this part of the transition, the voltages across both transformers' secondary windings will be approximately the output voltage minus half the voltage across C3. As the oscillation ensues, therefore, the transformer winding voltages, which started at zero, build up toward the output voltage.

The oscillation described above will continue until either the current $I_{LP2}$ reaches $(I_L - I_{MPK})$ or the voltages across C3 reaches zero. The first scenario occurs for lower values of $(I_L - I_{MPK})$ and the second occurs for higher values of this current.

If $I_{LP2}$ reaches $(I_L - I_{MPK})$ first (and assuming the voltage across C3 has fallen below the threshold voltage of Q3 so that $I_{LP1}$ is flowing through the body diode of Q3), the oscillation stops because the body diode will not let $I_{LP1}$ go negative. $I_{LP2}$ and $I_{LP1}$ will hold constant at $(I_L-I_{MPK})$ and zero, respectively. Whatever voltage remains across C3 will then discharge linearly due to the current $I_{LP2}$ until the body diode of Q4 turns on. The body diode will then carry $I_{LP2}$ until the overlap interval is over and Q1 is turned off.

When Q1 is turned off, the magnetizing current $I_{MPK}$ will charge the parallel capacitance of C4 and C1, the parasitic output capacitance of Q1, until the voltage across them is high enough to forward bias the clamping diode D3. At this point the reset portion of T1's cycle commences.

Notice that for this first scenario, the complete transition is accomplished with portions of oscillatory rings that, to first order, are lossless. (Some loss does occur due to parasitic series resistance, but this is generally less than 20% of the total energy and typically around 5%.) It could be said that the energy that had been stored in $L_{P1}$, has been transferred to $L_{P2}$, and that the energy that had been stored in C3 has been transferred to C4.

If, on the other hand, the voltage across C3 reaches zero (or, more precisely, a diode drop negative) first, then the body diode of Q4 will turn on and prevent this voltage from ringing further negative. The currents $I_{LP1}$ and $I_{LP2}$ (which are flowing through the body diodes of Q3 and Q4) will hold constant until the overlap interval is over and Q1 is turned off.

Once Q1 is turned off, an oscillation ensues between $L_{P1}$, and C1. This oscillation is driven by the current remaining in $L_{P1}$, when Q1 was turned off. Given typical parameter values, this oscillation will continue until $I_{LP1}$ reaches zero, at which point the body diode of Q3 will turn off. Finally, the magnetizing current $I_{MPK}$ charges up the parallel combination of C4 and C1 until the clamping diode D3 turns on to start the reset half-cycle.

Notice that for this second scenario, the transition is almost accomplished in a (to first order) lossless manner. Some loss does occur because in the final portion of the transition the voltages across C4 and C1 do not start out equal. C1 has already been partially charged whereas C4 is still at zero volts. As these capacitor voltages equalize, an energy will be lost. This lost energy is a small fraction (typically less than one third) of the energy stored in C1 before the equalization occurs. The energy stored in C1 equals the energy stored in $I_{LP1}$ when Q1 was turned off, which itself is a small fraction (typically less than one third) of the energy that was stored in this parasitic inductance when it was carring the full load current, $(I_L-I_M)$. As such, the energy lost in this second scenario is a very small fraction (typically less than one ninth) of the total energy originally stored in (or delivered to) $L_{P1}$, $L_{P2}$, C3 and C4. In other words, most of the parasitic energy is recovered.

Note that since the second scenario has a small amount of loss, it may be desirable to avoid this scenario by adjusting component values. One approach would be to make C3 and C4 bigger by augmenting the parasitic capacitors with explicit capacitors placed in parallel. With large enough values it is possible to ensure that the first scenario described above holds true for the full range of load currents expected.

The descriptions given above for both scenarios must be modified to account for the nonlinear nature of capacitors C3, C4, and C1, and also to account for the reverse recovery charge of the body diodes of Q3 and Q4. The details of the nonlinear waveforms are too complex to be described here, but the goal of recovering most of the parasitic energy is still achieved.

As mentioned previously, it is desirable to keep the overlap period as short as possible to minimize the time that the secondary currents are flowing through the body diodes of Q3 and Q4. It is also desirable to allow the energy recovering transitions just described to reach completion. These two competing desires can be traded off to determine an optimum overlap duration. In general, it is desirable to make sure the new primary switch is turned on before the old one is turned off, and that the portion of the half-cycle during which the uncontrolled rectifiers are conducting should, for efficiency sake, be less than 20%. Note that due to delays in the gate drive circuitry it is possible for the overlap interval to appear negative at some point in the control circuit.

Figure 6A:
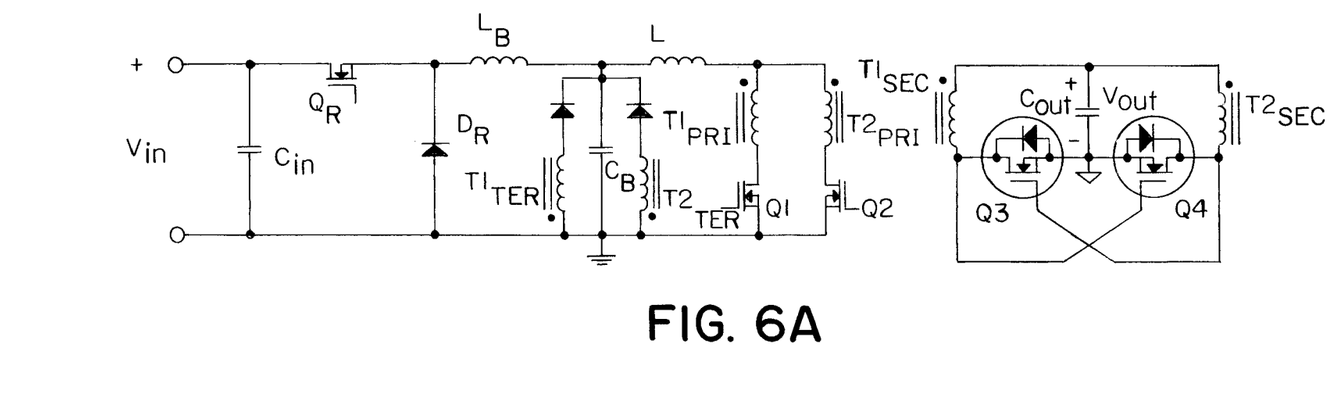
FIG. 6A illustrates another embodiment of the invention with the tertiary winding connected to the primary side.

The size of the output filter required to achieve a given output voltage ripple is affected by the AC ripple in the current of inductor L. This ripple current is largely caused by the switching action of the preregulation stage. A larger inductance, or a higher order filter for the output of the regulation stage, as shown in FIG. 6 where inductor $L_B$ and capacitor $C_B$ have been added, will reduce this ripple current.

The required size of the output filter is also affected by the AC ripple currents flowing in the magnetizing inductances of the transformers. Making these inductances as large as possible to reduce their ripple currents is therefore desirable. It is also beneficial to connect the tertiary reset windings back to a suitable point on the primary side as shown in FIG. 6A where they are connected to capacitor $C_B$, rather than to connect them to the output filter, as shown in FIG. 3. This alternative connection reduces by a factor of two the ripple current seen by the output filter due to the magnetizing inductance currents, compared to the connection shown in FIG. 3, since these magnetizing currents no longer flow to the output capacitor during their respective reset half cycles.

Figure 6B:
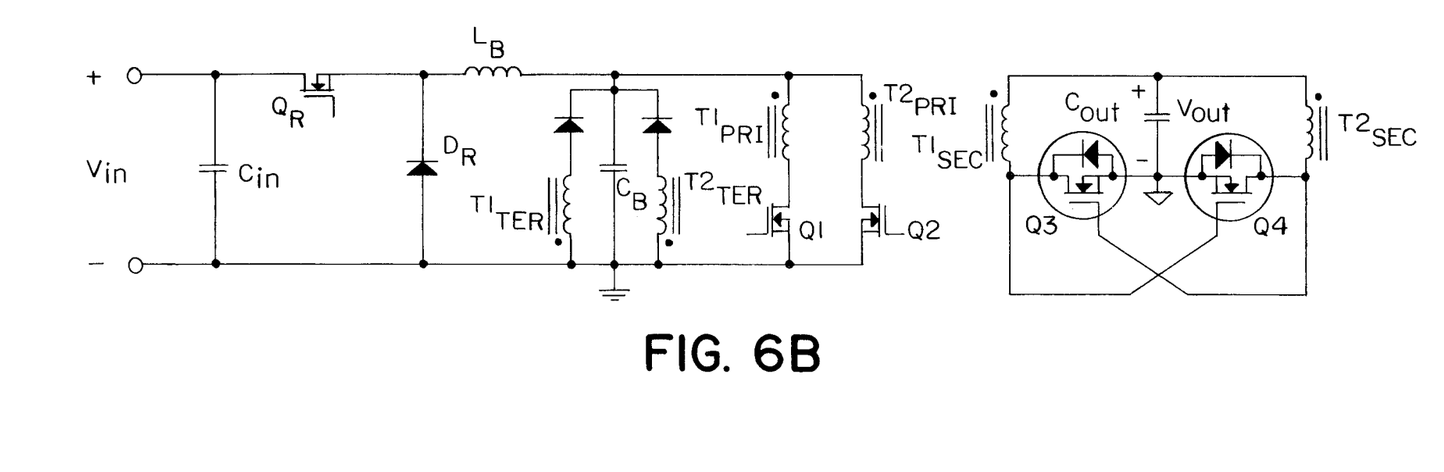
FIG. 6B illustrates another embodiment of the invention with a voltage fed isolation stage.

The power converter circuits described so far have all had an isolation stage that is current fed. It is also possible to incorporate the invention with an isolation stage that is voltage fed. By "voltage fed" it is meant that the voltage across the primary side of the isolation stage is held relatively constant over the time frame of the switching cycle. Such a converter circuit is shown in FIG. 6B where two uncoupled transformers are used.

The operation of the voltage-fed isolation stage is slightly different than for a current-fed isolation stage. Each primary transistor is still turned on for approximately one half the cycle, but instead of providing a brief overlap period during which both primary transistors, Q1 and Q2, are turned on together, here the primary transistors are both turned off for a brief overlap period.

During each half cycle, the current flowing into one primary winding and out its respective secondary winding can be determined as follows. Say transistors Q1 and Q3 have just been turned on to begin a new half cycle. At the completion of their switch transition they will be carrying some initial current (to be discussed in more detail below). There is also a difference between the voltage across capacitor $C_B$ and the voltage across capacitor $C_{OUT}$, both reflected to the secondary side. This voltage differential will be called $\Delta V$. It appears across the series circuit composed of the leakage/parasitic inductances and resistances of the primary and secondary windings, $T_{1PRI}$ and $T_{1SEC}$, the transistors Q1 and Q3, and the capacitors $C_B$ and $C_{OUT}$. The current flowing through this series L-R circuit responds to the voltage across it, $\Delta V$, in accordance with the component values, all referenced to the secondary side.

Since $C_B$ and $C_{OUT}$ are charged and discharged throughout the half cycle, $\Delta V$ will vary. But if we assume $\Delta V$ is relatively constant, then the current flowing through the series L-R circuit will change exponentially with an L/R time constant. If this time constant is long compared to the duration of the half cycle, then the current will have a linearly ramping shape. If the time constant is short, that the current will quickly reach a steady value determined by the resistance.

To understand the switch transitions that occur between each half cycle, consider the leakage/parasitic inductances, $L_{P1}$, and $L_{P2}$, and the capacitances associated with the controlled rectifiers, C3 and C4, to be modeled in the same way as was shown in FIG. 5. Assume Q2 and Q4 have been on and are carrying a final current level, $I_F$, at the end of the half cycle. Transistor Q1 is then turned on, causing the voltage $V_{CB}$ to be applied across primary winding $T1_{PRI}$ and its reflected value across secondary winding $T1_{SEC}$. An oscillation between C4 and $L_{P1}$, will ensue, with the voltage across C4 starting at approximately twice the output voltage. After approximately one quarter of a cycle of this oscillation, the voltage across C4 will attempt to go negative and be clamped by the body diode of Q3. At this point the current flowing through $L_{P1}$, will have reached a peak value, $I_S$, determined by approximately twice the output voltage divided by the characteristic impedance, $\sqrt{L_{P1}/C4}$. This transition discharges capacitor C4 and builds up the current in $L_{P1}$, to the value $I_S$ in a nearly lossless manner.

During the quarter cycle of oscillation the voltage across the gate of transistor Q4 will drop below the threshold value for the device, and the channel of Q4 will turn off. The current that had been flowing through the channel will commutate to the body diode of Q4.

At this point current if flowing through both transformers' secondary windings and through the body diodes of Q3 and Q4. Q3 is carrying the current $I_S$ and Q4 is carrying the current $I_F$. Now transistor Q2 is turned off and its voltage rises as parasitic capacitors are losslessly charged until the voltage is clamped by the diode in series with the tertiary windings, $T2_{TER}$. Inductor $L_{P2}$ now has a negative voltage across it and its current $I_{LP2}$, will therefore linearly ramp down to zero as its energy is recovered back to CB through the clamping circuit. Once this current reaches zero, the body diode of Q4 will turn off and the current will become negative, but only to the point where it equals the second transform's magnetizing current, $I_{MPK}$ (reflected to the secondary side). This current will linearly charge capacitor C3 nearly losslessly as energy is delivered to the capacitor from the magnetizing inductance of the second transformer (reflected to the secondary side). This current will linearly charge capacitor C3 nearly losslessly as energy is delivered to the capacitor from the mangetizing inductance of the second transformer.

As the voltage across C3 rises above the threshold value, transistor Q3 will turn on and the current that had been flowing through the body diode of Q3 will commutate to the channel of Q3. The new half cycle will then proceed as discussed above, with $I_S$ being the initial value of current mentioned in that discussion.

As with the current-fed isolation stage, the transition between the two half cycles has a period of time when the two body diodes are conducting. This condition is highly dissipative and should be kept short by keeping the overlap period that both primary side transistors, Q1 and Q2, are off short.

In all of the power converter circuits described above, it might be desirable to slow down the switch transitions in the isolation stage for many reasons. For instance, slower transitions might reduce the high frequency differential-mode and common-mode ripple components in the output voltage waveform. There are several ways the switch transitions might be slowed down. For instance, in a well known manner a resistor could be placed in series with the gate of the primary side transistor Q1 (or Q2) in FIG. 5 so that its gate voltage would change more slowly. Similarly, a resistor could be placed in series with the gate of a synchronous rectifier Q3 or (Q4). In either case an RC circuit is created by the added resistor, R, and the capacitance, C, associated with the transistor. If this RC product is long compared to the normal length of the oscillatory transitions described above, the switch transitions will be slowed down.

If the length of the switch transitions are on the order of $\sqrt{(LC)}$ or longer, where L is the leakage/parasitic inductance ($L_{P1}$, and/or $L_{P2}$) that oscillates with the capacitor C4 (or C3), then the nearly lossless transitions described above will not be achieved. The more the switch transitions are slowed down, the more the energy delivered to and/or recovered from the capacitors associated with the controlled rectifiers will be dissipated. As such, there is a tradeoff between the power converter's efficiency and its other attributes, such as output ripple content. This tradeoff might result in slower switch transitions in situations where high efficiency is not required or if better synchronous rectifiers in the future have much smaller capacitances.

As discussed above, the synchronous rectifier MOSFETs Q3 and Q4 in the circuit of FIG. 3 are driven with a gate-source voltage equal to approximately twice the output voltage. For a 5 volt output, the 10 volt drive that results is appropriate for common MOSFETs. If the output voltage is such that the gate drive voltage is too large for the ratings of the MOSFET, however, steps must be taken to reduce the drive voltage. For example, if the output voltage is 15 volts, a 30 volt gate drive will result, and it is typically desired that the gate be driven to only 10 volts. Also, some MOSFETs are designed to be driven with only 5 volts, or less, at their gates.

Figure 7:
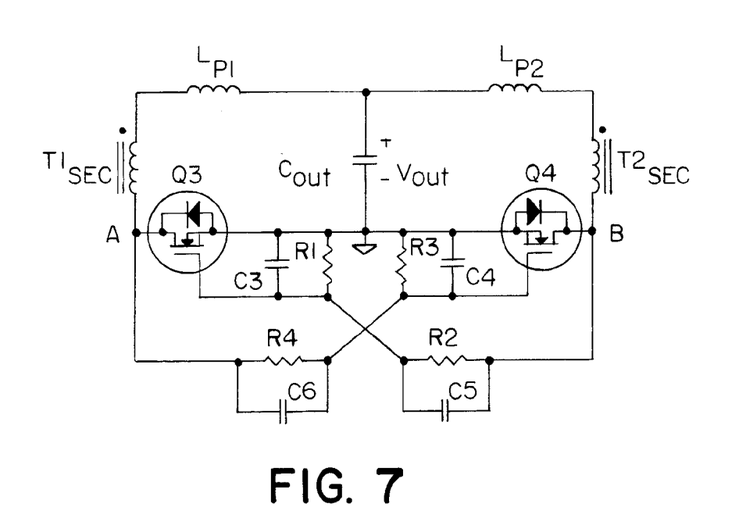
FIG. 7 illustrates a secondary circuit having capacitive dividers to divide the voltages applied to the control terminals of the controlled rectifiers.

FIG. 7 shows one way to reduce the drive voltage while maintaining the energy recovery feature. The voltage waveform at node B (or at node A) is capacitively divided down by the series combination of capacitors C5 and C3 (or by C6 and C4). The values of these capacitors are chosen to provide the division of the AC voltage provided at node B (or node A) as desired. For example, if node B has a 30 volt step change and a 10 volt step change is desired at the gate of Q3, then C5 should have one half the capacitance of C3. Since C3 may be comprised of the parasitic capacitance of Q3, it is likely to be nonlinear. In this case, an effective value of capacitance that relates the large scale change in charge to the large scale change in voltage should be used in the calculation to determine C5.

Since a capacitor divider only divides the AC components of a waveform, additional components need to be added to determine the DC component of the voltage applied to the gates of Q3 and Q4. FIG. 7 shows one way to do this in which two resistors, R1 and R2 (or R3 and R4), provide the correct division of the DC component of the voltage at node B (or node A). These resistors should have values large enough to keep their dissipation reasonably small. On the other hand, the resistors should be small enough such that the time constant of the combined capacitor/resistor divider is short enough to respond to transients such as start-up.

Other techniques employing diodes or zener diodes that are known in the art could be used instead of the resistor technique shown in FIG. 7.

One variation of the invention described herein would be to create a power supply with multiple outputs by having more than one secondary winding on each transformer in the isolation stage. For example, by using two secondary windings with the same number of turns it would be possible to create a positive 12 volt output and a negative 12 volt output. If the two secondary windings have a different number of turns it would be possible to create two output voltages of different magnitudes (e.g., 5 volts and 3.3 volts). Another approach for creating multiple outputs would be to have multiple isolation stages, each with a turns-ratio appropriate for their respective output voltages.

When multiple outputs are provided in this manner, a phenomenon commonly called cross-regulation occurs. A single regulation stage cannot control the various output voltages independently, and these output voltages depend not just on the relative turns ratios, but also on the voltage drops that result as the various output currents flow through the impedances of their various output paths. A change in any one or more output currents therefore causes a change in the voltages of those outputs that are not used for feedback to the regulation stage. If this variation due to changes in output currents is a problem, then various approaches for providing regulation of the uncontrolled outputs can be provided. For example, a linear regulator might be added to each output that is not otherwise regulated.

One advantageous approach to providing linear regulation with the power circuits described here is to control how much the synchronous rectifier MOSFETs are turned on during their conduction state. This can be done by adding circuitry to limit the peak voltage to which their gates will be driven so that their on-state resistances can be made larger than their minimum values. It can also be done by controlling the portion of operative half cycle during which a MOSFET's gate voltage is allowed to be high so that the MOSFET's body diode conducts for the rest of the time. With both techniques, the amount to which the output voltage can be regulated is the difference between the voltage drop of the synchronous rectifiers when their channels are fully on (i.e., when they are at their minimum resistance) and when only their body diodes are carrying the current.

One way to accomplish the first technique, that of controlling the peak gate voltage, is to use the basic capacitor divider circuit that was shown in FIG. 7. All that is needed is to make the resistor divider ratio, (or, alternatively, the diode clamping voltage if such an approach is chosen) dependent on a control signal derived from the error in the output voltage compared to its desired value. The goal is to shift the DC component of the gate voltage in response to the error signal such that the peak voltage applied to the gate, and therefore the on-state resistance and voltage of the synchronous rectifier, helps to minimize this error. Various control circuitry schemes that might be used to achieve this goal will be obvious to one skilled in the art. Note that this approach preserves the energy recovery feature of the gate drive. Note also that if the voltages at nodes A and B are such that no AC division is desired, then C5 and C6 should be made large compared to C3 and C4.

Figure 8:
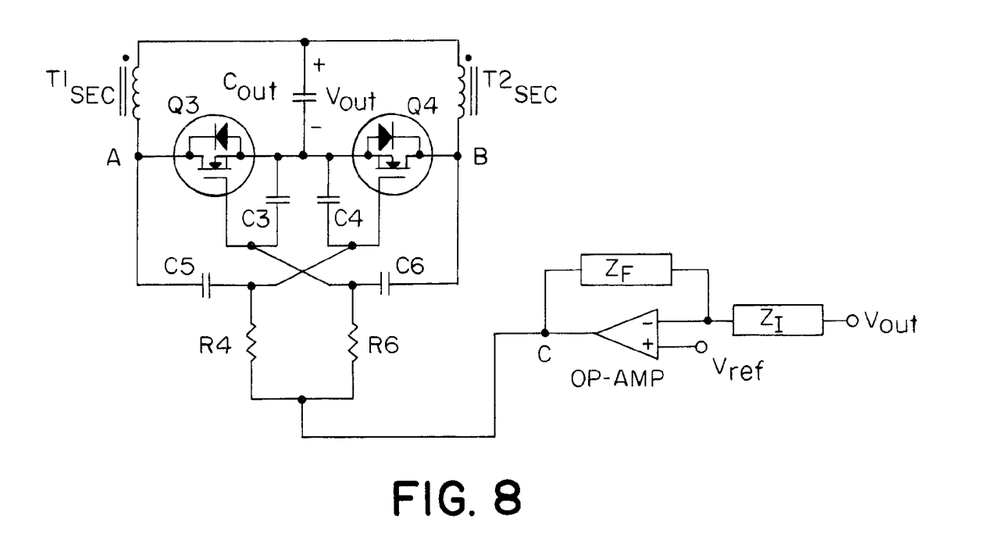
FIG. 8 shows an alternative embodiment in which the output is regulated by controlling the voltage applied to the control terminals of the controlled rectifiers.

FIG. 8 shows an alternative method to control the DC component of the gate voltage waveform. The output voltage (or a scaled version of it) is subtracted from a reference voltage and the error is multiplied by the gain of an op-amp circuit. The output of the op-amp (node C) is then connected to the synchronous rectifier gates through resistors that are large enough to not significantly alter the AC waveforms at the gates. With this connection, the DC components of the gate voltages will equal the output voltage of the op-amp at node C. If the gain of the op-amp circuit is large enough, such as when an integrator is used, the error in the output voltage will be driven toward zero. $Z_F$ and $Z_I$ are impedances that should be chosen, with well established techniques, to ensure stability of this feedback loop while providing the gain desired.

The range of voltage required at the output of the op-amp depends on the particular application, and it may include negative values. This range influences the supply voltage requirements for the op-amp. Also, if the op-amp's output voltage gets too high, the synchronous rectifiers may not turn off when they are supposed to. Some means of limiting this voltage, such as a clamp circuit, may therefore be desirable.

One way to accomplish the second technique, that of controlling the portion of the half cycle in which the MOSFET is gated on, is to place a low power switch network between the gate of Q3 (or Q4), node B (or node A), and ground. This network (composed, say, of analog switches operated with digital control signals) might be used to keep the gate voltage grounded for some period of time after the node voltage increases, and to then connect the gate to node B (or A) for the remainder of the half cycle with a switch capable of bidirectional current flow. The length of the delay would be based on a signal derived from the error in the output voltage. With this approach, the energy recovery feature associated with discharging each synchronous rectifier's gate capacitance is preserved, but the charging transition will become lossy. Alternatively, the switch network could be controlled to start out the half cycle with the gate connected to node B (or A), and then after some delay to connect the gate to ground.

Using a synchronous rectifier to provide regulation as well as rectification, as described above, is not limited to multiple-output situations. It can also be used in single-output situations either as the total regulation stage or as an additional regulation stage to augment the first one.

It is also possible to use DC-DC switching regulators on the secondary side to achieve the additional regulation desired, or to create more than one output voltage from any of the outputs of the isolation stage.

With multiple outputs it is not necessary for the gate of each controlled rectifier to be connected to secondary winding of the other transformer which corresponds to the same output. For instance, if the two outputs are 5 volts and 3.3 volts, the gates of the 3.3 volts output controlled rectifiers could be connected to the 5 volt output secondary windings. Doing so would give these controlled rectifiers a 10 volt gate drive, resulting in a lower on-state resistance than if they had a 6.6 volt gate drive.

In some situations, it may be desirable to place the isolation stage first in the power flow, and to have the regulation stage follow. For example, when there are many outputs sharing the total power, the circuit might be configured as one isolation/step-down (or step-up) stage followed by several DC-DC switching or linear regulators.

No matter where the isolation stage is situated, if it is to be current fed this requirement could be met with active circuitry as well as by a passive component such as an inductor. For instance, if the current fed isolation stage follows a regulation stage that is achieved with a linear regulator, then this linear regulator could be designed to have a large AC output impedance to achieve the input requirement of the current fed isolation stage.

When the regulation stage precedes the isolation stage, it is not necessary to sense the isolated output voltage to control the regulation. An alternative approach is to sense the voltage on the primary side of the isolation stage, which may eliminate the need for secondary side circuitry and the need to bridge the feedback control signal across the isolation barrier.

For example, in FIG. 6 the voltage across $C_B$, the capacitor of the third-order output filter of the down converter, could be used. This voltage nearly represents the isolated output voltage (corrected for the turns-ratio). It differs only due to the resistive (and parasitic inductance commutation) drops between $C_B$ and the output. Since these drops are small and proportional to the current flowing through the isolation stage, the error in output voltage they create can either be tolerated or corrected.

To correct the error, the current on the primary side could be sensed, multiplied by an appropriate gain, and the result used to modify the reference voltage to which the voltage across $C_B$ is compared. Since these resistive drops vary with temperature, it might also be desirable to include temperature compensation in the control circuitry. Note that this approach could also be used to correct for resistive drops along the leads connecting the supply's output to its load.

Figure 9:
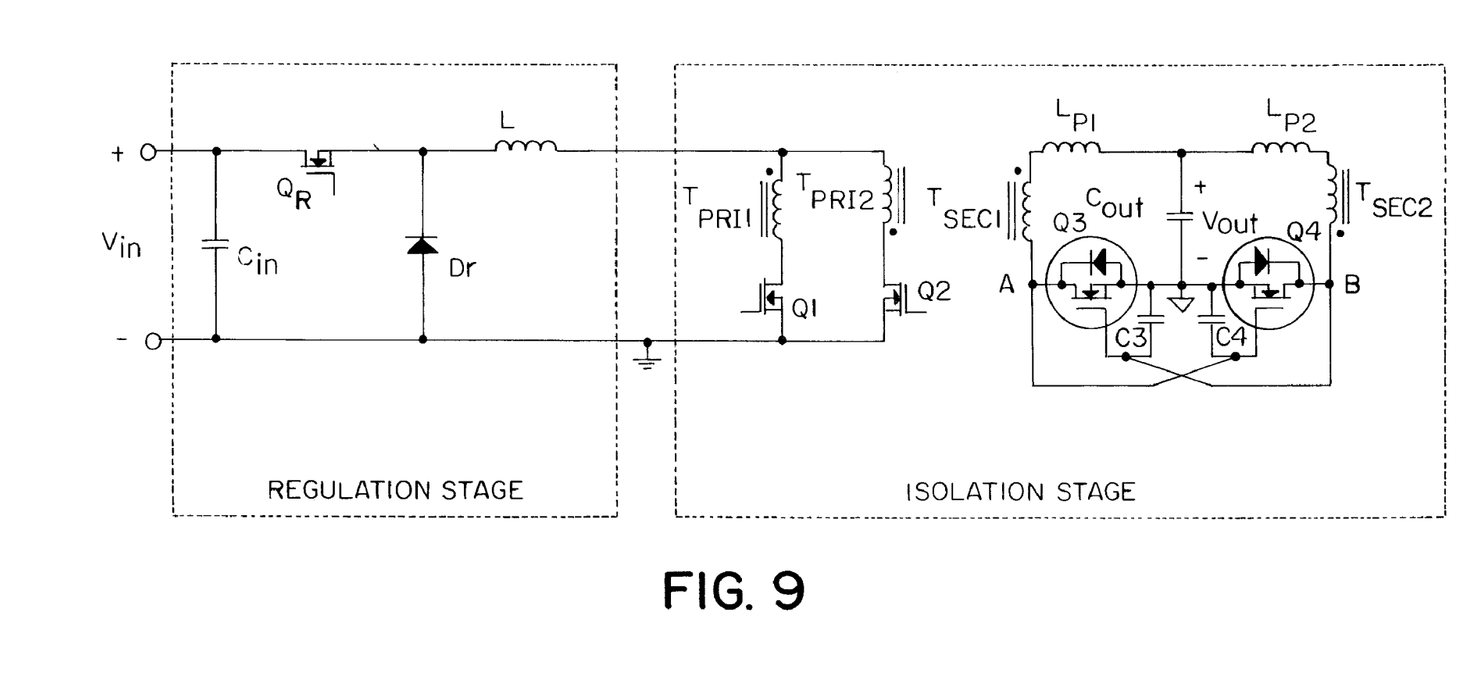
FIG. 9 illustrates an embodiment of the invention in which the primary windings are tightly coupled.

The embodiments of the invention described above have used two uncoupled transformers for the isolation stage. It is also possible, as shown in FIG. 9, to use a single transformer T in which, for example, there are two primary windings $T_{PRI1}$, $T_{PRI2}$ and two secondary windings, $T_{SEC1}$, $T_{SEC2}$. While the two primary windings may be tightly coupled, either the two secondaries should be loosely coupled to each other or the connections to the output capacitors and synchronous rectifier transistors should provide adequate parasitic inductance. The resulting leakage and parasitic inductance on the secondary side can then be modeled as is shown in FIG. 9.

With this inductance present in the secondary side loops, the operation of the coupled isolation stage during the overlap period is similar to what was described above for the uncoupled case. With Q1 and Q3 on, turn Q2 on. The voltage across the transformer windings, as modeled in FIG. 9, drops to zero, which is consistent with what must happen if the primary windings are tightly coupled. A nearly-lossless energy saving transition involving inductor/capacitor oscillations and linear discharges then ensues.

What is different here is that the overlap period during which both Q1 and Q2 are on cannot last too long. If the overlap lasts too long, the transient waveforms will settle into a state where the voltages at nodes A and B rise to the output voltage. If this voltage is higher than the gates' threshold levels, transistors Q3 and Q4 will partially turn on. A large amount of energy will then be dissipated while this state persists, and it is possible for the output capacitor to be significantly discharged.

These problems can be avoided by making sure the overlap period when both Q1 and Q2 are on does not last too long. For a given converter, an overlap period can be found which will give the highest converter efficiency. The more leakage/parasitic inductance there is, the longer an overlap period that can be tolerated. Based on the overlap time provided by a given control circuit, it may become necessary to add additional inductance by increasing the leakage or parasitic inductance.

With a coupled transformer it is not necessary to provide a separate reset circuit (whether it uses a tertiary winding or not) since the magnetizing current always has a path through which it can flow. With a coupled transformer it is necessary to keep the lengths of the two halves of the cycle well balanced to avoid imposing an average voltage across the core and driving it into saturation. Several techniques for balancing the two half cycles are well known in the art.

When two or more power supplies are connected in parallel, diodes are sometimes placed in series with each supply's output to avoid a situation where one supply's failure, seen as a short at its output, takes down the entire output bus. These "ORing" diodes typically dissipate a significant amount of energy. One way to reduce this dissipation is to replace the diode with a MOSFET having a lower on-state voltage. This "ORing" synchronous rectifier MOSFET can be placed in either output lead, with its body diode pointing in the direction of the output current flow.

Figure 10:
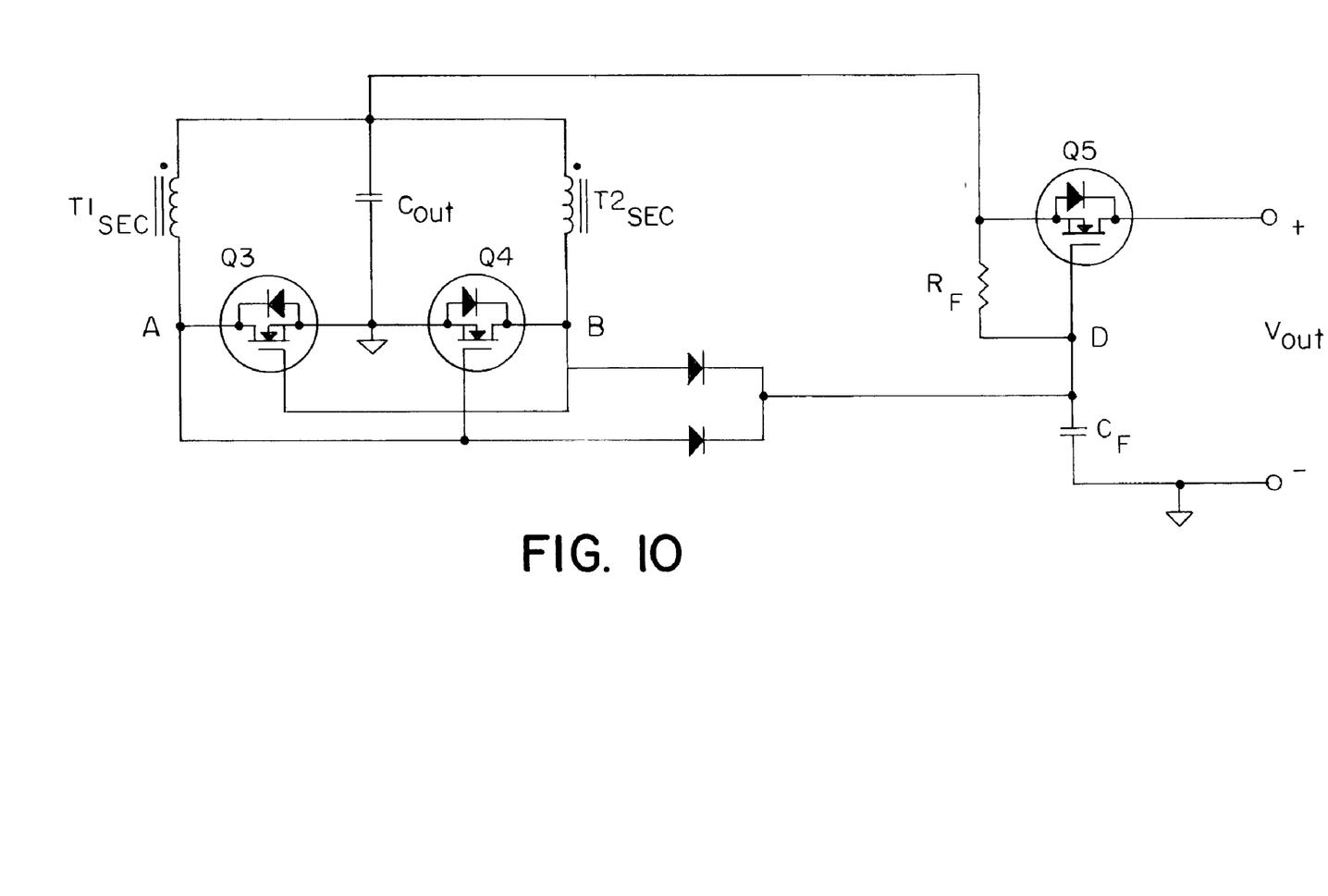
FIG. 10 illustrates the use of an ORing controlled rectifier to couple the power converter to an output bus.

With the invention described here, the voltage for driving the gate of this MOSFET, Q5, can be derived by connecting diodes to node A and/or node B (or to nodes of capacitor dividers connected to these nodes), as shown in FIG. 10. These diodes rectify the switching waveforms at node A and/or node B to give a constant voltage suitable for turning on the ORing MOSFET at node D. A filter capacitor, $C_F$, might be added to the circuit as shown in the figure, or the parasitic input capacitance of the ORing MOSFET might be used alone. A resistor $R_F$ ensures the gate voltage discharges when the drive is removed.

If the power supply fails in a way that creates a short at its output, such as when a synchronous rectifier shorts, the voltages at nodes A and B will also be shorted after the transient is complete. With its gate drive no longer supplied, the ORing MOSFFT will turn off, and the failed supply will be disconnected from the output bus.

When two (or more) power supplies of the type described here are placed in parallel, a problem can arise. If one power supply is turned on while another is left off (i.e. not switching), the output bus voltage generated by the first supply will appear at the gates of the second supply's synchronous rectifiers. Once this voltage rises above the threshold value, these synchronous rectifiers will turn on and draw current. At the least this will result in extra dissipation, but it could result in a shorted output bus. This problem can occur even if both supplies are turned on and off together if one supply's transition "gets ahead" of the other.

There are several approaches to solving this problem. One is to make sure both supplies have matched transitions. Another is to connect the supplies together with ORing diodes so that no supply can draw current from the combined output bus. If an ORing MOSFET is used instead of an ORing diode, however, this second approach can still fail to solve the problem. For instance, consider the case where a supply drives its ORing MOSFET with the technique shown in FIG. 10. Assume the bus voltage is already high due to another supply, and the first supply is then turned on in a way that causes its output voltage to rise slowly toward its desired value. If the ORing MOSFET's gate voltage rises high enough to turn it on before the newly rising output voltage approximately matches the existing bus voltage, then there will be at least a momentary large current flow as the two voltages equalize. To avoid this problem additional circuitry can be added to make sure an ORing MOSFET is not turned on until its supply's output voltage has approximately reached the bus voltage. This might be done by sensing the two voltages and taking appropriate action, or it might be done by providing a delay between when the ORing MOSFET's gate drive is made available and when it is actually applied to the gate. Such a delay should only affect the turn-on, however; the turn-off of the ORing MOSFET should have minimal delay so that the protective function of the transistor can be provided.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims. For instance, the regulation stage could be composed of an up-converter. The ideas that have been presented in terms of the N-channel implementation of the synchronous rectifier MOSFET can be modified to apply to the P-channel implementation, as well. The components shown in the schematics of the figures (such as Q3 in FIG. 3) could be implemented with several discrete parts connected in parallel. In addition, certain aspects of the invention could be applied to a power converter having only one primary transformer winding and/or one secondary transformer winding.

What is claimed is:

1. A power converter, comprising:
    a primary transformer winding circuit having at least one primary winding;
    a secondary transformer winding circuit comprising:
        at least one secondary winding coupled to the at least one primary winding;
        a controlled rectifier transistor, each primary winding having a voltage waveform with transition times which are short relative to the on-state and off-state times of the controlled rectifier; and
        a capacitive divider circuit, a signal controlling the controlled rectifier transistor being derived from the capacitive divider circuit.

2. A power converter as claimed in claim 1 further comprising a circuit to determine the DC component of the signal controlling the controlled rectifier transistor.

3. A power converter as claimed in claim 2 wherein the dc component of the signal is adjusted to provide regulation.

4. A power converter as claimed in claim 3 wherein a feedback circuit sets the DC component of the signal controlling the controlled rectifier transistor.

5. A power converter as claimed in claim 3 wherein the power converter provides multiple outputs, the DC component being adjusted to set an output level of at least one of the outputs.

6. A power converter as claimed in claim 1 wherein a control terminal of the controlled rectifier transistor is connected directly to the capacitive divider circuit.

7. A power converter as claimed in claim 1 wherein the capacitive divider circuit includes at least one capacitor external from the controlled rectifier transistor.

8. A power converter as claimed in claim 1 wherein one of two capacitors composing the capacitive divider circuit is substantially entirely intrinsic parasitic capacitance.

9. A power converter as claimed in claim 1 wherein the capacitive divider circuit is coupled to a terminal of a secondary winding of a transformer in the power converter.

10. A power converter as claimed in claim 1 wherein the controlled rectifier transistor is in parallel with an uncontrolled rectifier.

11. A power converter as claimed in claim 10 wherein the uncontrolled rectifier is a body diode in the controlled rectifier transistor.

12. A power converter as claimed in claim 1 wherein a DC component of the signal is adjusted in response to a condition of the power converter.

13. A power converter as claimed in claim 1 wherein a DC component of the signal is adjusted to a state where only the uncontrolled rectifier carries current.

14. A power converter as claimed in claim 1 wherein a DC component of the signal is adjusted to a state where the controlled rectifier transistor is capable of only unidirectional current flow for a period of time.

15. A method for providing rectification in a power converter, comprising:
    controlling a voltage waveform across a primary transformer winding;
    rectifying an AC waveform by a controlled rectifier transistor in a secondary transformer winding circuit, each primary winding having a voltage waveform with transition times which are short relative to the on-state and off-state times of the controlled rectifier; and
    capacitively dividing the AC waveform to derive a control signal used to control the controlled rectifier transistor.

16. A method as claimed in claim 15 further including determining a DC component of the control signal.

17. A method as claimed in claim 16 further including adjusting the DC component of the control signal to provide regulation.

18. A method as claimed in claim 17 wherein adjusting the DC component of the control signal includes feeding back a feedback signal derived from the regulated output of the power converter.

19. A method as claimed in claim 17 wherein (i) the power converter provides multiple outputs and (ii) adjusting the DC component sets an output level of at least one of the outputs.

20. A method as claimed in claim 15 further including rectifying the AC waveform in an uncontrolled manner.

21. A method as claimed in claim 15 wherein capacitively dividing the AC waveform is done, in part, external from a component used for rectifying the AC waveform in a controlled manner.

22. A method as claimed in claim 15 wherein capacitively dividing the AC waveform is done, in part, internal to a component having inherent parasitic capacitance used for rectifying the AC waveform in a controlled manner.

23. A method as claimed in claim 15 wherein a DC component of the control signal is adjusted in response to a condition of the power converter.

24. A method as claimed in claim 15 wherein a DC component of the control signal is adjusted to a state where only the uncontrolled rectifier carries current.

25. A method as claimed in claim 15 wherein a DC component of the control signal is adjusted to a state where the controlled rectifier transistor is capable of only unidirectional current flow for a period of time.

26. A power converter comprising:
    a primary transformer winding circuit having at least one primary winding;
    a secondary transformer winding circuit comprising:
        at least one secondary winding coupled to the at least one primary winding;
        means for rectifying an AC waveform by a controlled rectifier transistor, each primary winding having a voltage waveform with transition times which are short relative to the on-state and off-state times of the controlled rectifier; and
        means for capacitively dividing the AC waveform to derive a control signal used to control the controlled rectifier transistor.

* * * * *